(12) United States Patent
Andoh et al.

(10) Patent No.: US 7,238,922 B2
(45) Date of Patent: Jul. 3, 2007

(54) STEAM COOKER

(75) Inventors: Yuhji Andoh, Yamatokoriyama (JP); Toshiyuki Irie, Kashiba (JP); Shinya Ueda, Yamatotakada (JP); Masami Umemoto, Amagasaki (JP); Tadanobu Kimura, Mie (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 0 days.

(21) Appl. No.: 10/564,092

(22) PCT Filed: Jul. 26, 2004

(86) PCT No.: PCT/JP2004/010622

§ 371 (c)(1),
(2), (4) Date: Jan. 11, 2006

(87) PCT Pub. No.: WO2005/012797

PCT Pub. Date: Feb. 10, 2005

(65) Prior Publication Data

US 2006/0191892 A1    Aug. 31, 2006

(30) Foreign Application Priority Data

Jul. 31, 2003  (JP)  ............. 2003-204196
Jan. 7, 2004   (JP)  ............. 2004-001868

(51) Int. Cl.
*A21B 1/24*    (2006.01)
*A21B 3/04*    (2006.01)

(52) U.S. Cl. .............. 219/401; 219/400; 126/20; 126/21 A (58) Field of Classification Search .......... None
See application file for complete search history.

(56) References Cited

U.S. PATENT DOCUMENTS 5,215,000 A * 6/1993 Desage et al. ............ 219/401
5,525,782 A * 6/1996 Yoneno et al. ............ 219/682
5,934,178 A   8/1999 Caridis et al.
6,008,482 A   12/1999 Takahashi et al.

FOREIGN PATENT DOCUMENTS

JP   54-59372 A    5/1979
JP   54-127769 A   10/1979

(Continued)

*Primary Examiner*—J. Pelham
(74) *Attorney, Agent, or Firm*—Birch, Stewart, Kolasch & Birch, LLP (57) ABSTRACT

A steam cooker, wherein a sub cavity incorporating a steam heating heater is formed at the center of the ceiling part of a heating chamber. Steam in the heating chamber is sucked into an air blow device through a suction port and force-fed into the sub cavity through an external circulating passage. Gas passed through the external circulation passage sucks steam from a steam generator midway in the external circulation passage and enters from the external circulation passage into the sub cavity. The steam heated by the steam heating heater until it is brought into an superheated state is jetted downward from a plurality of upper gas jetting holes formed in the bottom panel of the sub cavity by such a force that makes the steam reach the bottom of the heating chamber so that the steam can be collided with a heated matter. The steam is raised on the outside of downward air flow and the convection of steam occurs in the heating chamber.

11 Claims, 10 Drawing Sheets

FOREIGN PATENT DOCUMENTS

| | | |
|---|---|---|
| JP | 56-10202 | 1/1981 |
| JP | 6-42750 A | 2/1994 |
| JP | 7-293889 A | 11/1995 |
| JP | 8-178298 A | 7/1996 |
| JP | 9-4849 A | 1/1997 |
| JP | 10-290752 A | 11/1998 |
| JP | 2002-153380 A | 5/2002 |

* cited by examiner

FIG. 11

STEAM COOKER

TECHNICAL FIELD

The present invention relates to a steam cooker.

BACKGROUND ART

Conventionally, there have been proposed various steam cookers for performing cooking by using steam. Examples of the steam cookers can be seen in Patent Publications 1 to 3. For example, Patent Publication 1 discloses a steam cooking apparatus that blows steam into a food tray. Patent Publication 2 discloses a heat cooking apparatus that supplies superheated steam into an cooking chamber or makes steam in the cooking chamber superheated steam by radiation heat. Patent Publication 3 discloses a heat cooking apparatus that supplies superheated steam to the whole cooking chamber and/or a portion in the vicinity of foods.

Patent Publication 1: JP-U 03-67902 (1991) (p. 4 to 6 in whole specification, FIGS. 1 to 3)

Patent Publication 2: JP-A 08-49854 (1996) (p. 2 to 3, FIGS. 1 to 8)

Patent Publication 3: JP-A 11-141881 (1999) (p. 3 to 5, FIGS. 1 to 3)

DISCLOSURE OF THE INVENTION

Problems to be Solved by the Invention

The steam cooking apparatus disclosed in Patent Publication 1 is an apparatus for professional use in which steam is supplied to a plurality of food trays from a steam supply pipe. The configuration is not preferable from an aesthetic viewpoint since the steam supply pipe is provided uncovered in the cooking chamber, and is not suitable for a cooker for home-use. The area where steam jet can reach is rather limited by the shape of the steam supply pipe and it is difficult to uniformly blow steam to foods (i.e., object to be heated) in the cooking chamber.

The heat cooking apparatus disclosed in Patent Publication 2 has a configuration in that steam is not blown toward foods but foods are cooked by being surrounded by steam; this configuration does not guarantee swift transmission of a large quantity of heat to foods.

In the heat cooking apparatus disclosed in Patent Publication 3, a pipe for supplying steam in the vicinity of foods is projected into the cooking chamber. Like Patent Publication 1, the configuration is not preferable from an aesthetic viewpoint and is not suitable for a cooker for home-use. Moreover, since the steam jet is targeted at a small spot on foods, it is rather difficult to uniformly spray steam on foods.

The present invention has been made in consideration of the above points, and an object of the present invention is to provide an aesthetically preferable steam cooker for home-use having high heating efficiency and can heat foods intensely by uniformly and rapidly transmitting a large quantity of heat to foods, not by heating the whole cooking chamber.

Means for Solving the Problem

In order to achieve the above object, a steam cooker according to the present invention comprises the following constituents:

(a) a cooking chamber in which foods are put;
(b) a steam generator; and
(c) a top blowhole which is provided at a top part of the cooking chamber and from which steam supplied from the steam generator is blown downward with force so as to reach a bottom of the cooking chamber.

With this configuration, steam is blown from the top blowhole provided at the top part of the cooking chamber and a steam supply pipe is not disposed in a lower position in the cooking chamber, so that the steam cooker is preferable as a cooker for home-use from an aesthetic viewpoint. Since the steam is blown with force so as to reach the bottom of the cooking chamber, the steam forcefully strikes foods put at a level higher than the bottom of the cooking chamber, and foods are rapidly heated. Different from the case in which the temperature of the whole cooking chamber for cooking is risen, the basic concept of the present invention is to intensely heat foods by making the steam jet come into direct contact with foods, thereby the heat energy is concentrated on foods and cooking can be performed efficiently.

In the above steam cooker according to the present invention, the top blowhole is directed to foods put in the cooking chamber.

With this configuration, since the top blowhole is directed to foods put in the cooking chamber, the foods are intensely heated.

In the above steam cooker according to the present invention, the top blowhole is provided on a ceiling of the cooking chamber.

With this configuration, since the top blowhole is provided on the ceiling of the cooking chamber, a pipe system for steam supply does not become uncovered in the cooking chamber. Thus, the steam cooker can attain an appearance suitable for a cooker for home-use.

In the above steam cooker according to the present invention, the top blowhole is disposed at a center portion of the ceiling.

With this configuration, since the top blowhole is disposed at the center portion of the ceiling of the cooking chamber, steam blown downward strikes foods, then deflects from the downward current, and then turn round upward. Since steam is lighter than air, this change of direction takes place in a natural course resulting in formation of convection current in the cooking chamber. The convection current makes the steam jet from the top blowhole continuously strike foods to transmit a large quantity of heat, while the temperature in the cooking chamber is maintained at desired level.

In the above steam cooker according to the present invention, the top blowhole is directed right downward.

With this configuration, since the top blowhole is directed right downward, the jet direction of steam is matched with the vertical axis, which is a reference of the geometrical shape of the cooking chamber, and orderly convection current can be generated. When foods are put right below the top blowhole, heat can be efficiently transmitted to foods.

In the above steam cooker according to the present invention, the top blowhole consists of plurality of perforations, and the perforations are disposed so as to spread over the foods that foods are substantially wrapped by steam blown from the top blowhole.

With this configuration, since the top blowhole consists of plurality of perforations, and the perforations are disposed so as to spread over the foods that foods are substantially wrapped by steam blown from the top blowhole, steam strikes the whole top face of foods. Because wide area of foods is struck by steam, heat of the steam is quickly and efficiently transmitted to foods.

In the above steam cooker according to the present invention, the perforations of the top blowhole are disposed comparatively densely in the center portion and comparatively sparsely in the peripheral portion.

With this configuration, since the perforations of the top blowhole are disposed comparatively densely in the center portion and comparatively sparsely in the peripheral portion, the steam current has weakened downward force at its peripheral portion, thereby up-flow of the steam is not hindered and a distinctive convection current is formed.

In the above steam cooker according to the present invention, steam generated by the steam generator is introduced into a sub-cavity provided adjacent to the cooking chamber and heated there, and is blown from the top blowhole.

With this configuration, since steam generated by the steam generator is introduced into the sub-cavity provided adjacent to the cooking chamber and heated there, and is blown from the top blowhole, the temperature of the steam can be risen to desired level at a place just adjacent to the cooking chamber, heat loss during gas transfer is small.

In the above steam cooker according to the present invention, steam heating means is disposed in the sub-cavity.

With this configuration, since the steam heating means is disposed in the sub-cavity, the steam introduced into the sub-cavity can be efficiently heated.

In the above steam cooker according to the present invention, the top blowhole is formed in a partition panel between the sub-cavity and the cooking chamber.

With this configuration, since the top blowhole is formed in a partition panel between the sub-cavity and the cooking chamber, the steam in the sub-cavity can enter the cooking chamber passing the shortest distance.

In the above steam cooker according to the present invention, both sides of the partition panel wear dark color.

With this configuration, since both sides of the partition panel wear dark color, heat in the sub-cavity is easily absorbed from one side of the partition panel and is radiated from the other side into the cooking chamber. Consequently, temperature rise in the sub-cavity and the outer surface of the sub-cavity becomes modest resulting in improved safety. One the other hand, the heat in the sub-cavity is transferred to the cooking chamber via the partition panel, and foods are heated more efficiently.

According to the present invention, the above steam cooker further comprises a blower for forcibly feeding steam generated by the steam generator to the top blowhole.

With this configuration, since the blower forcibly feeds steam generated by the steam generator to the top blowhole, steam jet with enough momentum to reach the bottom of the cooking chamber can easily be obtained.

In the above steam cooker according to the present invention, the blower and the steam generator are disposed within an external circulation path communicating a suction port provided in the cooking chamber with the top blowhole.

With this configuration, since the blower and the steam generator are disposed within an external circulation path communicating a suction port provided in the cooking chamber with the top blowhole, thereby the steam blown into the cooking chamber passes through the external circulation path and returns to the cooking chamber. Different from the case of continuously blowing steam in one-way, the steam generator of high performance is not required, and thereby the steam cooker is suitable for home-use. Since the blower forces steam to return to the cooking chamber, the steam can be blown through the top blowhole with force.

In the above steam cooker according to the present invention, the suction port is disposed at a lower part of the cooking chamber.

With this configuration, since the suction port is disposed at a lower part of the cooking chamber, steam jet travels straight without being deflected to strike foods, and then, is sucked into the suction port. Thus, the capability of transmitting heat to foods is maintained at high level. Since the steam blown from above is sucked into the suction port at the lower part, when the door is opened, the steam will not flow toward the user aggressively, making the safety level of the steam cooker high.

In the above steam cooker according to the present invention, the suction port is disposed at an upper part of the cooking chamber.

In this configuration, since the suction port is disposed at an upper part of the cooking chamber, steam is sucked into the blower from the upper corner of the cooking chamber where the convection stagnates. Therefore, the convection current is not easily be disturbed, and a cycle, in which steam blown downward strikes foods, then deflects from the downward current, and then turn round upward, and thereby forming convection current, is stably maintained.

Advantages of the Invention

According to the present invention, since steam jet is blown from the top blowhole provided at the top part of the cooking chamber so as to reach the bottom of the cooking chamber, and the steam jet forcefully strikes foods put at a level higher than the bottom of the cooking chamber, the heat energy is concentrated on foods and cooking is performed efficiently. The blower and the steam generator are disposed within an external circulation path communicating a suction port provided in the cooking chamber with the top blowhole, and thereby the steam is circulated. Different from the case of continuously blowing steam in one-way, the steam generator of high performance is not required, and thereby the steam cooker can be used in home. And, by the structure of introducing steam into the sub-cavity provided adjacent to the cooking chamber, heating the steam in the sub-cavity to required temperature, and blowing the heated steam from the top blowhole, heat loss is small and, also, the steam can be blown with increased force.

LIST OF REFERENCE SYMBOLS 1 steam cooker
20 cooking chamber
21 pan
24 suction port
25 blower
30 external circulation path
40 sub-cavity
41 steam heater
42 bottom panel
43 top blowhole
44 steam bleeding port
50 steam generator

BEST MODE FOR CARRYING OUT THE INVENTIONS

Embodiments of the present invention will be described below with reference to the drawings.

Figure 1:
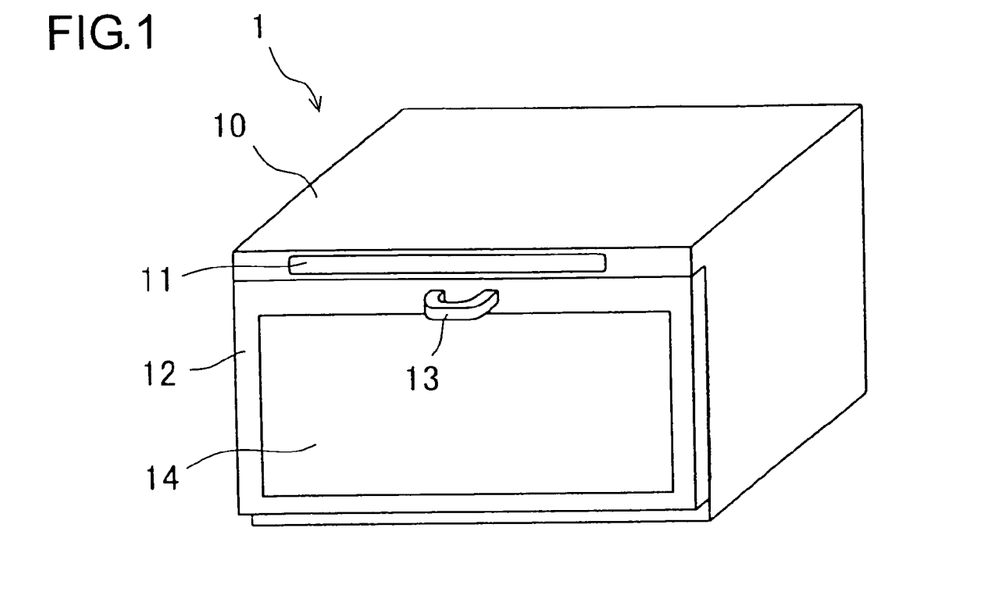
FIG. 1 A perspective view of a steam cooker according to a first embodiment.

A steam cooker 1 comprises a cabinet 10 of a rectangular parallelepiped shape. In a front face of the cabinet 10, an operation panel 11 is provided on an upper part and a door 12 is provided below the operation panel 11. The door 12 swings around its lower end as a center in a vertical plane. A user grips a handle 13 provided on an upper part of the door 12 and pulls to the front, thereby enabling a posture of the door 12 to be changed by 90° from a perpendicular closed state shown in FIG. 1 to a horizontal open state shown in FIG. 2. Most part of the door 12 is a window 14 in which a pane of heat-resistive glass is fit.

Figure 2:
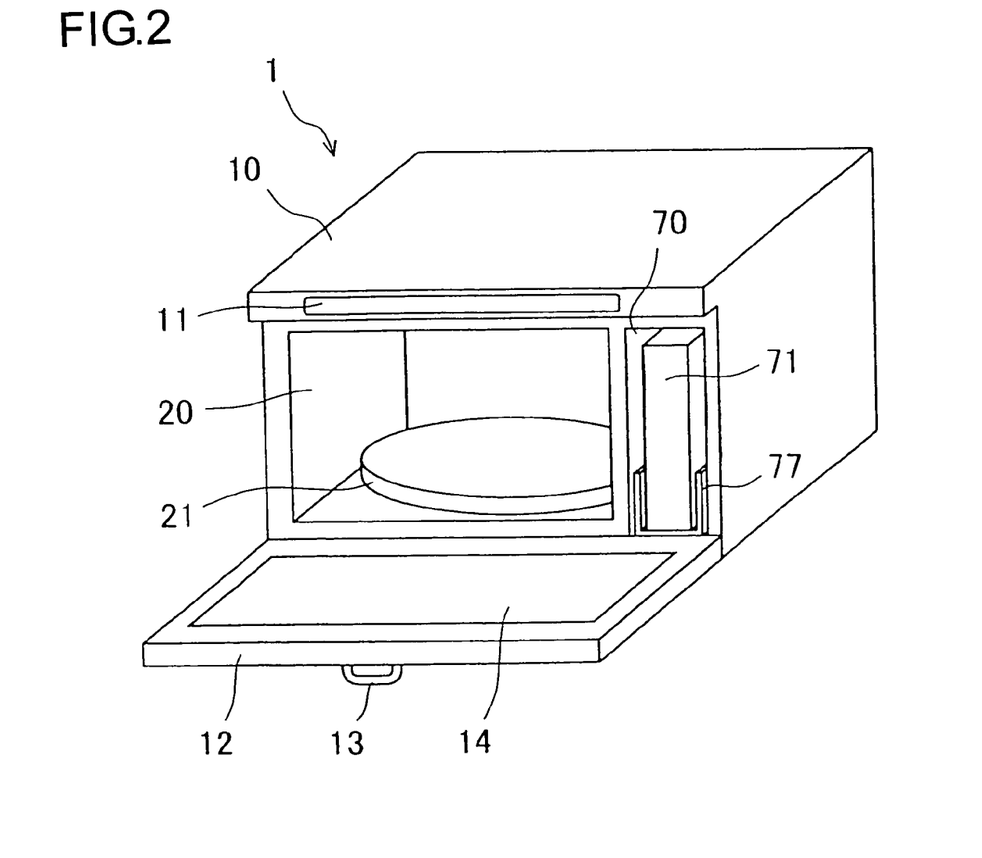
FIG. 2 A perspective view of the steam cooker in a state where a door of a cooking chamber is open.

When the door 12 is opened, two compartments appear as shown in FIG. 2. A large compartment on the left side is a cooking chamber 20, and a small compartment on the right side is a water tank chamber 70. The structures and accompanying components of the cooking chamber 20 and the water tank chamber 70 will be described below with reference to FIG. 3 and subsequent drawings.

Figure 3:
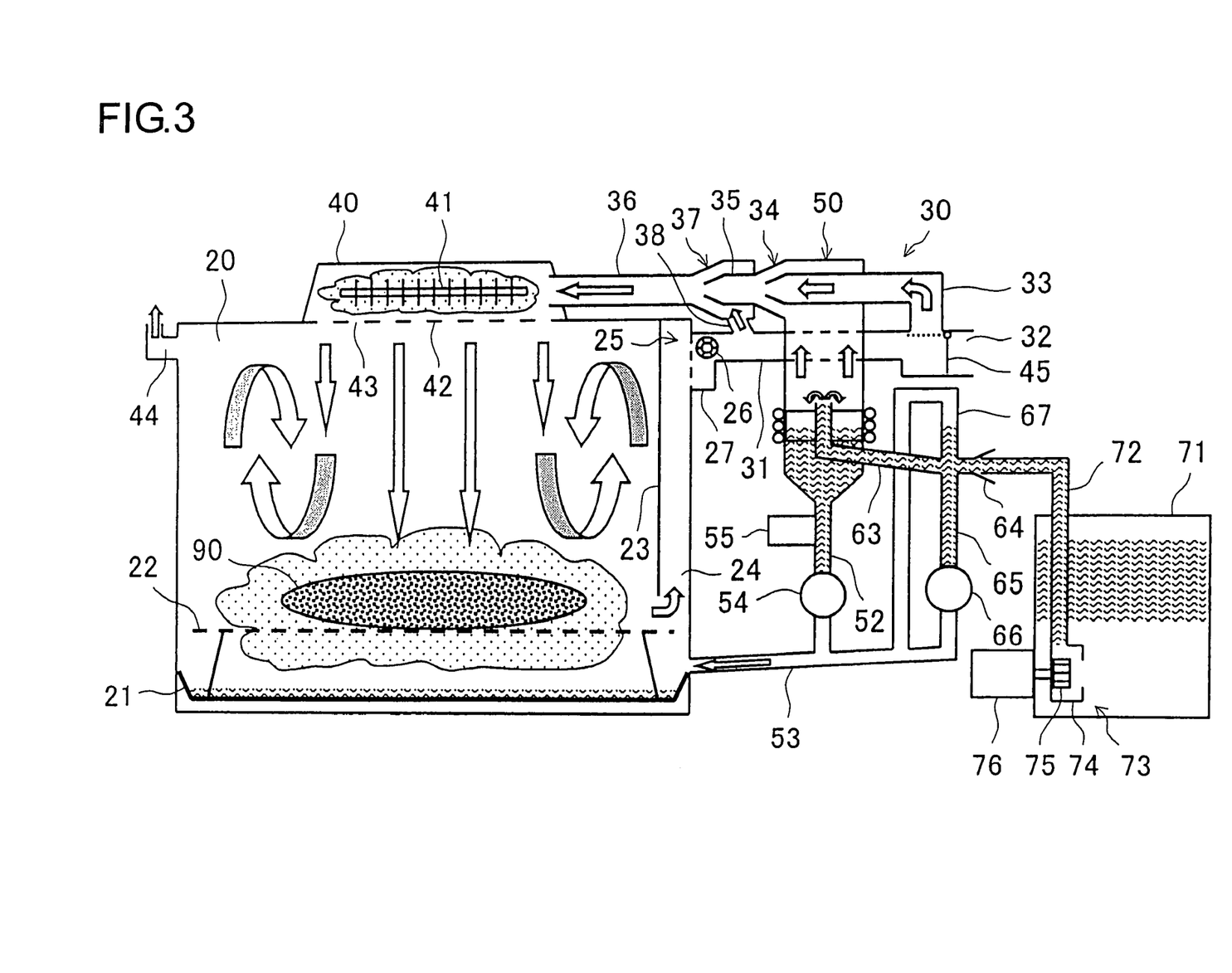
FIG. 3 A basic structural diagram of an internal mechanism.

The cooking chamber 20 has a rectangular parallelepiped shape and its whole front side facing the door 12 is an opening. The other faces of the cooking chamber 20 and the inner face of the door 12 are formed with stainless steel plates. The periphery of the cooking chamber 20 and the inside of the door 12 are thermal-insulated. A pan 21 made of a stainless steel plate is disposed on the floor face of the cooking chamber 20, and a rack 22 made of a stainless steel wire, on which foods 90 are placed, is disposed on the pan 21.

Gas in the cooking chamber 20 (Usually, the gas in the cooking chamber 20 is air. When steam cooking starts, the air is replaced by steam. In the specification, description will be given on assumption that the air has been replaced with steam in the cooking chamber 20.) is circulated via an external circulation path 30 shown in FIG. 3. Beside a side wall of the cooking chamber 20, an gas current control plate 23 (also made of a stainless steel plate) extending downward from the ceiling to a position near the floor face is disposed in parallel with the side wall. A gap between the lower end of the gas current control plate 23 and the side wall at the back serves as a suction port 24 facing downward, which leads steam into the external circulation path 30.

A blower 25 provided in an upper part on the outside of the cooking chamber 20 serves as the start point of the external circulation path 30. Steam sucked from the suction port 24 travels behind the gas current control plate 23 toward the blower 25. The blower 25 has a centrifugal fan 26, a fan casing 27 for housing the centrifugal fan 26 therein, and a motor (not shown) for rotating the centrifugal fan 26. A sirocco fan is used as the centrifugal fan 26. As the motor for rotating the centrifugal fan 26, a direct current motor capable of rotating at high speed is used.

The external circulation path 30 connected to the discharge port of the fan casing 27 is constructed mainly by combining pipes with circular cross section. A first pipe 31 is connected to the discharge port of the fan casing 27. The first pipe 31 extends in the horizontal direction and an exhaust port 32 is provided at the end of the first pipe 31. An elbow-shaped second pipe 33 is connected a little upstream of the exhaust port 32 of the first pipe 31. A horizontal part of the second pipe 33 extends in an upper part of a steam generator 50 (which will be described in detail later) and forms a steam ejector 34. The discharge end of the second pipe 33 is tapered, thereby becoming an inner nozzle of the steam ejector 34. An outer nozzle 35 of the steam ejector 34 extends from the side of the steam generator 50 to the downstream, and the discharge end of the outer nozzle 35 is tapered into a nozzle shape.

Figure 4:
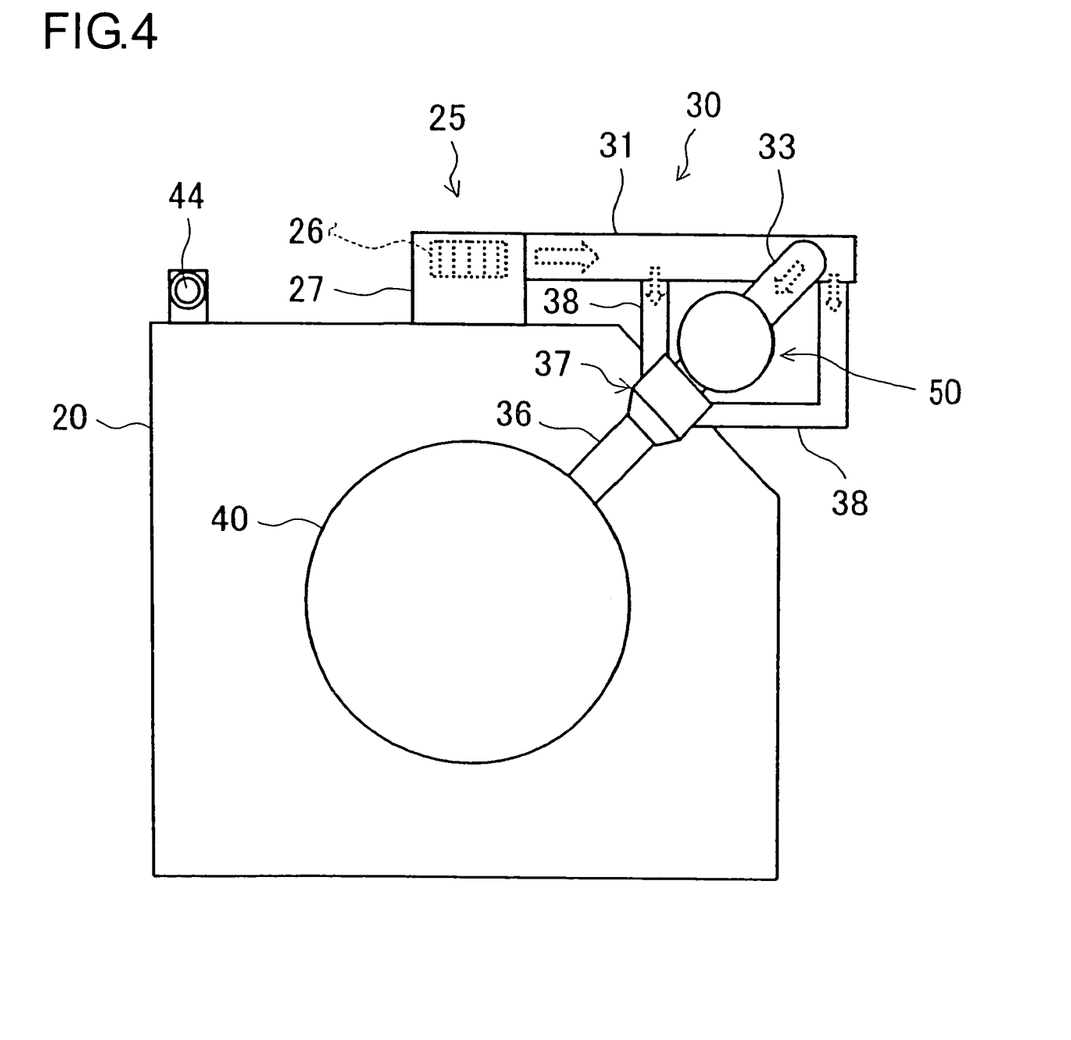
FIG. 4 A top view of the cooking chamber.

The nozzle-shaped discharge end of the outer nozzle 35 is fit in a third pipe 36 of the external circulation path 30 on the downstream of the steam ejector 34. An end of the third pipe 36 is bulged so as to surround the outer nozzle 35, and a rear ejector 37 is formed in this portion. The nozzle-shaped discharge end of the outer nozzle 35 of the steam ejector 34 plays the role of an inner nozzle in the rear ejector 37. A bypass 38 branched from the first pipe 31 is connected to the rear ejector 37. The bypass 38 is also formed with pipes with circular cross section. As shown in FIG. 4, two bypasses 38 are provided and steam is injected into the rear ejector 37 symmetrically in a horizontal plane.

The other end of the third pipe 36 is connected to a sub-cavity 40 provided adjacent to the cooking chamber 20. The sub-cavity 40 is provided above the ceiling of the cooking chamber 20 and in a portion corresponding to the center of the ceiling. The sub-cavity 40 has a circular shape in plan view, and a steam heater 41 as steam heating means is disposed inside the sub-cavity 40. The steam heater 41 takes the form of a sheathed heater.

The sub-cavity 40 is partitioned from the cooking chamber 20 by a partition panel. In the case of the embodiment, the partition panel is a bottom panel 42 of the sub-cavity 40. Specifically, an opening having the same size as that of the sub-cavity 40 is formed in the ceiling part of the cooking chamber 20, and the bottom panel 42 serving as the bottom of the sub-cavity 40 is fit in the opening.

The bottom plate 42 is made of a metal plate having plurality of small perforations, which collectively form a top blowhole 43. The perforations of the top blowhole 43 are directed right downward and are disposed so as to spread almost in the entire panel. The perforations of the top blowhole 43 spread over a plane two-dimensionally, however, it is also possible that the bottom panel 42 is made to have some undulation and the perforations of the top blowhole 43 are disposed three-dimensionally.

The upper and lower faces of the bottom panel 42 are finished in dark color by a surface processing such as coating. The bottom panel 42 may be made of a metal that changes into dark color with use. Alternatively, the bottom panel 42 may be constructed with a ceramic component of dark color.

It is not always necessary to form the bottom of the sub-cavity 40 with a separate member, i.e. the bottom panel 42. The top plate of the cooking chamber 20 can also be used as the bottom of the sub-cavity 40. In this case, the top blowhole 43 is provided at a portion corresponding to the sub-cavity 40, of the top plate, and the upper and lower faces of the top plate are finished in dark color.

At an upper corner of the cooking chamber 20, a steam bleeding port 44 is formed. A motor-operated damper 45 is disposed at the end of the first pipe 31. The damper 45 selectively closes the exhaust port 32 and the inlet of the second pipe 33.

Figure 5:
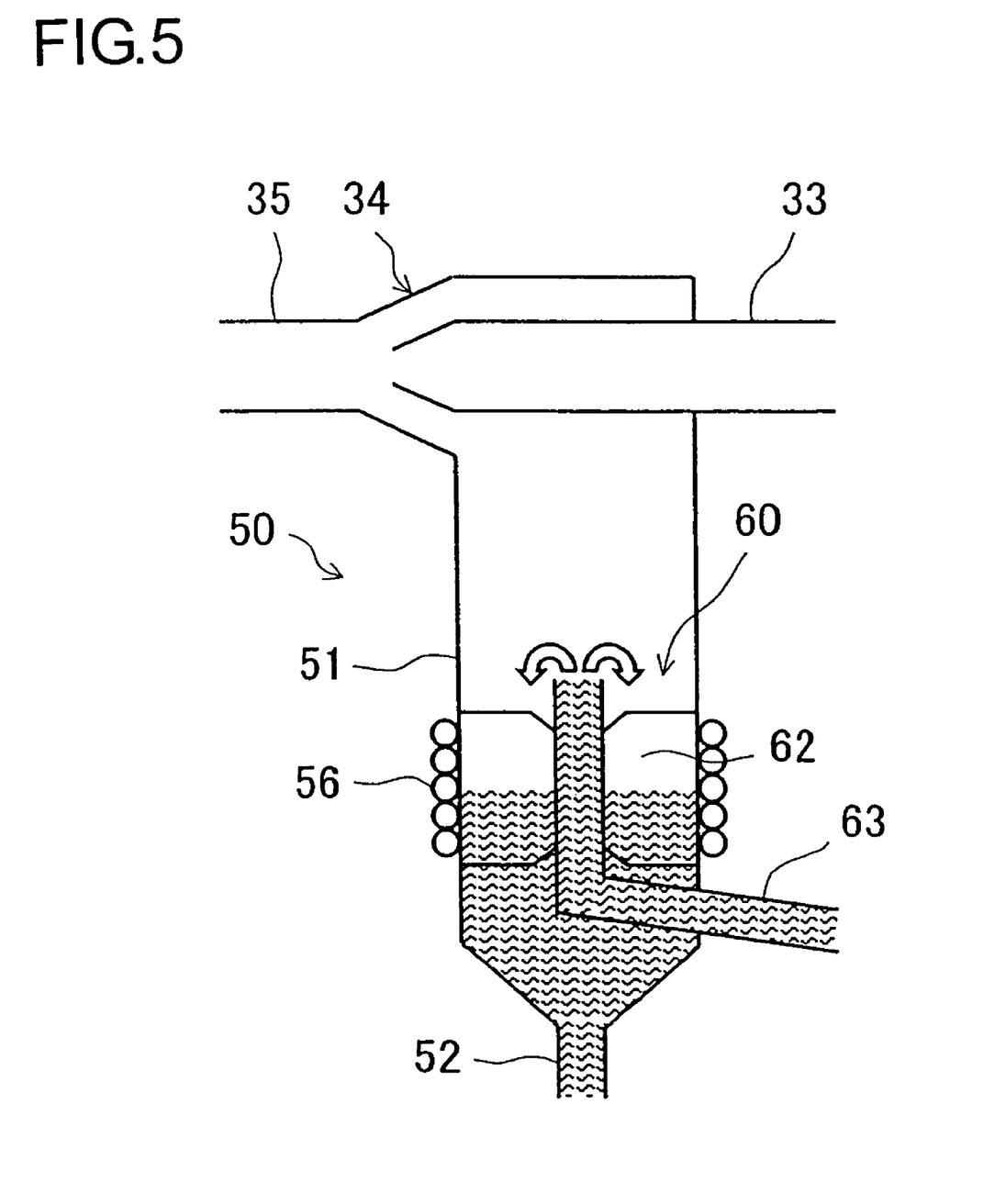
FIG. 5 A vertical sectional view of a steam generator.
Figure 6:
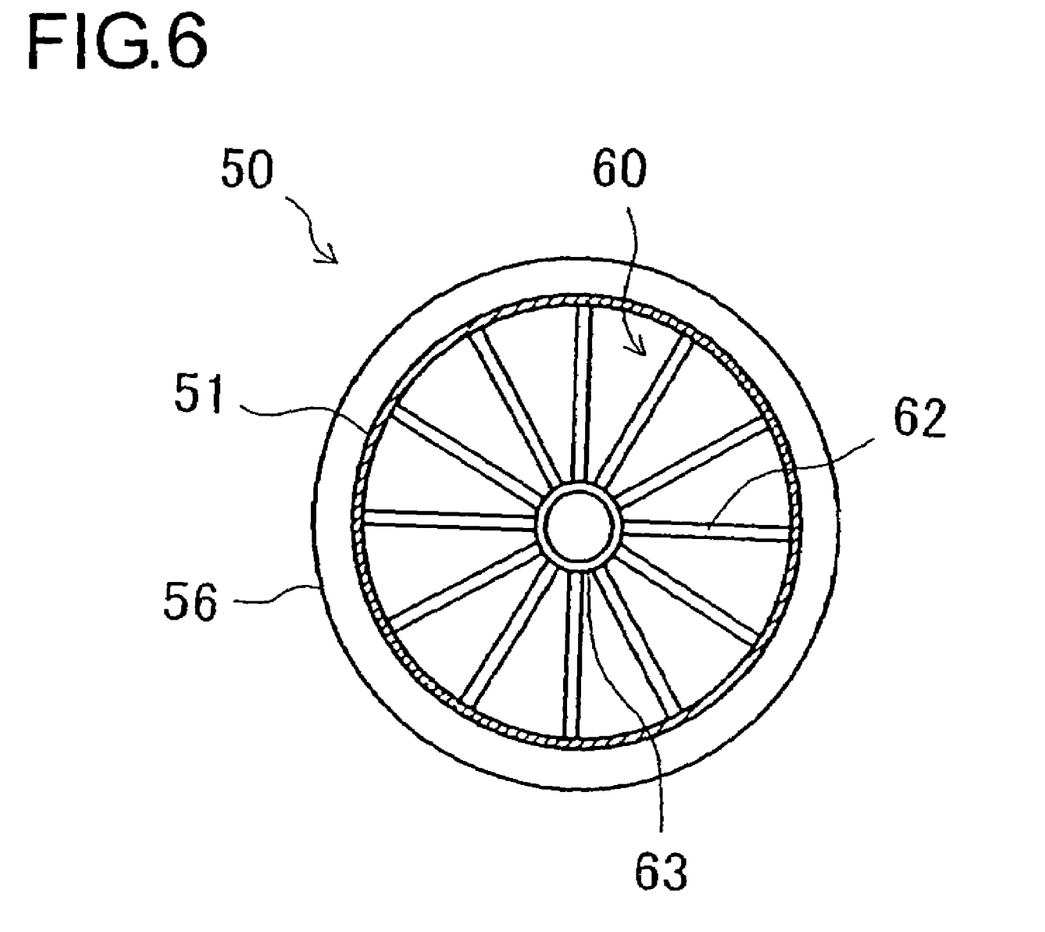
FIG. 6 A horizontal sectional view of the steam generator.

The structure of the steam generator 50 will now be described with reference to FIGS. 5 and 6. The steam generator 50 has a cylindrical pot 51 with its center line disposed perpendicularly. The top portion of the pot 51 is closed and the steam ejector 34 is formed thereon as described above.

The bottom portion of the pot 51 is formed in a funnel shape, and a drain pipe 52 extends downward therefrom. The lower end of the drain pipe 52 is connected to a drain pipe 53 disposed so as to be slightly inclined from the horizontal line. An end of the drain pipe 53 extends through the side wall of the cooking chamber 20 to a position above the pan 21. A drain valve 54 and a water-level sensor 55 are provided on some midpoints of the drain pipe 52.

The water in the pot 51 is heated by a steam generation heater 56, which is closely attached to the outer surface of the pot 51. The steam generation heater 56 takes the form of an annular sheathed heater. A heat transfer unit 60 is disposed inside the pot 51 at a height almost the same as the steam generation heater 56.

The heat transfer unit 60 is constructed with a plurality of fins 62. The fins 62 are disposed radially inside the pot 51 and their outer ends are connected to the inner face of the pot 51. The pot 51 and the fins 62 may be integrally formed by extrusion or may be fixed to each other by a method such as welding or soldering. The fin 62 has a predetermined length in the axial direction of the pot 51.

Water is supplied into the pot 51 via a water supply pipe 63. The water supply pipe 63 enters the pot 51 from a portion near the bottom portion of the pot 51 and extends upward between the fins 62. The upper end of the water supply pipe 63 is slightly higher than that of each of the fins 62. As shown in FIG. 6, when the fins 62 are regarded as spokes of a wheel, the water supply pipe 63 is disposed at the position of a hub. An end face of each of the fins 62 is brought into contact with the external surface of the water supply pipe 63 to thereby transfer heat to the water supply pipe 63 via the fins 62.

The pot 51, the heat transfer unit 60 and the water supply pipe 63 are each made of a metal having high heat conductivity. Copper or aluminum is recommendable for their high heat conductivity. Copper or copper alloy, however, is susceptible to patina. Consequently, although the heat conductivity is lower than that of copper or copper alloy, stainless steel, which is free from patina, can be an alternative.

A funnel-shaped inlet 64 is formed at an end of the water supply pipe 63. A flushing pipe 65 is connected in a position a little downstream of the inlet 64. The flushing pipe 65 is connected to the drain pipe 53 via a flushing valve 66.

To the water supply pipe 63, not only the flushing pipe 65 but also a water head pipe 67 having an inverted J shape are connected. The other end of the water head pipe 67 is connected to the drain pipe 53.

A water tank 71 having a thin rectangular parallelepiped shape is inserted into the water tank chamber 70. A water supply pipe 72 having an elbow shape, extended from the water tank 71, is connected to the inlet 64 of the water supply pipe 63. A pump 73 pumps water in the water tank 71 via the water supply pipe 72. The pump 73 is constructed with a pump casing 74 formed in the base portion of the water supply pipe 72, an impeller 75 housed in the pump casing 74, and a motor 76 for transmitting power to the impeller 75. The motor 76 is fixed to the side of the cabinet 10. When the water tank 71 is set in an appropriate position, the motor 76 is electromagnetically connected to the impeller 75.

A rail 77 having a trough shape, which supports the water tank 71, is fixed on the floor of the water tank chamber 70 (see FIG. 2). The tank supporting plane of the rail 77 is at the same level as the inner face of the door 12 opened horizontally. Consequently, the user puts the water tank 71 on the door 12 in the horizontal posture and pushes it along the rail 77, thereby enabling the water tank 71 to be smoothly set in a predetermined position in the water tank chamber 70. When the user opens the door 12 horizontally and pulls the water tank 71 out, the water tank 71 pulled out of the water tank chamber 70 is supported by the door 12. Therefore, the user does not have to support the water tank 71 with his/her hand for pulling it out.

Figure 7:
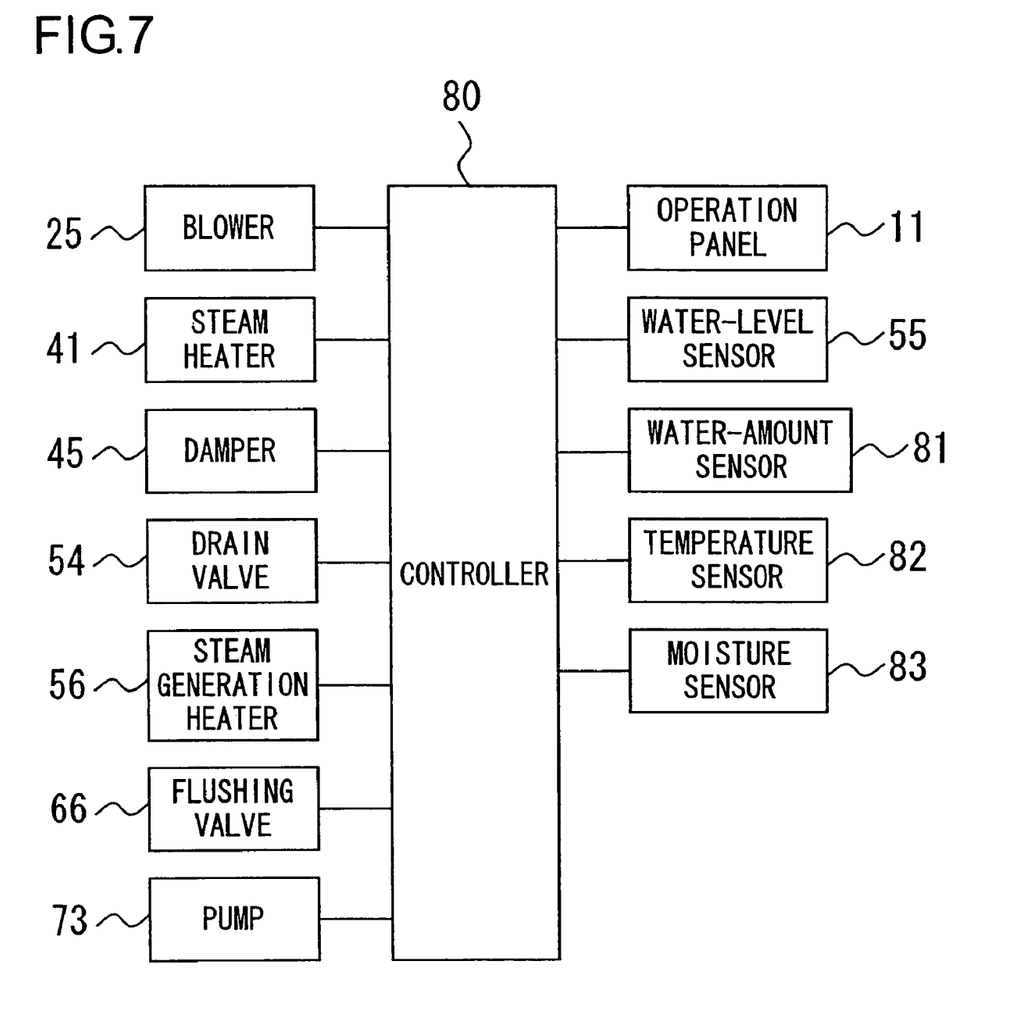
FIG. 7 A control block diagram.

A controller 80 shown in FIG. 7 controls the operation of the steam cooker 1. The controller 80 includes a microprocessor and a memory and controls the steam cooker 1 in accordance with an installed program. A control state is displayed on a display device in the operation panel 11. An operation instruction is input to the controller 80 via various operation keys disposed on the operation panel 11. A sound generator for generating sound signals is also disposed on the operation panel 11.

To the controller 80, not only the operation panel 11, but also the blower 25, the steam heater 41, the damper 45, the drain valve 54, the water-level sensor 55, the steam generation heater 56, the flushing valve 66 and the pump 73 are connected. In addition, a water-amount sensor 81 for measuring the amount of water in the water tank 71, a temperature sensor 82 for measuring the temperature in the cooking chamber 20, and a moisture sensor 83 for measuring moisture in the cooking chamber 20 are connected to the controller 80.

The steam cooker 1 operates as follows. First, the user opens the door 12, pulls the water tank 71 out of the water tank chamber 70, and supplies water into the tank from a water supply port (not shown). The user pushes the water tank 71 fully filled with water back into the water tank chamber 70 and sets it in the predetermined position. Confirming that the tip of the water supply pipe 72 is firmly connected to the inlet 64 of the water supply pipe 63, the user closes the door 12, and presses the power key in the operation panel 11 to turn the power on. The motor 76 of the pump 73 rotates and supply of water to the steam generator 50 starts. At this time, the drain valve 54 and flushing valve 66 are closed.

Water spouts from the tip of the water supply pipe 63 like a fountain and drops to the bottom portion of the pot 51 while wetting the fins 62 of the heat transfer unit 60. The water accumulates from the bottom of the pot 51. When the water-level sensor 55 senses that the water level reaches the half of the length of the heat transfer unit 60, the water supply is temporarily stopped. The water level in the pipe on the inlet side of the water head pipe 67 reaches the same level as that in the pot 51.

After the above-mentioned amount of water is supplied into the pot 51, the steam generation heater 56 is energized. The steam generation heater 56 heats water in the pot 51 from outside the side wall of the pot 51. When the side wall of the pot 51 is heated, the heat is conducted to the heat transfer unit 60 and transferred from the heat transfer unit 60 to the water. Since the height at which the steam generation heater 56 is disposed and the height at which the heat transfer unit 60 is disposed almost coincide with each other, heat is directly transferred from the steam generation heater 56 to the heat transfer unit 60 and efficiency of heat transfer is excellent.

The heat transfer unit 60 in which the plurality of fins 62 are disposed radially has a wide heat transfer area, so that water in the pot 51 is quickly heated. The fins 62 disposed radially support the pot 51 from the inside like the spokes of a wheel and the strength of the steam generator 50 is increased.

Concurrently with energization of the steam generation heater 56, energization of the blower 25 and the steam heater 41 is started. The blower 25 sucks gas in the cooking chamber 20 from the suction port 24 and blows the gas into the external circulation path 30. Since the centrifugal fan 26 is used to blow the gas, a higher pressure can be generated as compared with a propeller fan. Consequently, the steam is forcibly fed in the external circulation path 30. And because the centrifugal fan 26 is rotated at high speed by the DC motor, the pressure of gas current is high and flow velocity is also considerably high.

As the flow velocity of the gas current is high, the sectional area of the pass may be smaller relative to the flow rate. Therefore, the pipe used as a main body of the external circulation path 30 may have a circular cross section and, moreover, a small diameter. As compared with the case of forming the external circulation path 30 by a duct having a rectangular cross section, the surface area of the external circulation path 30 can be made smaller. Consequently, irrespective of the fact that hot gas passes the inside, heat dissipation from the external circulation path 30 is reduced, and the energy efficiency of the steam cooker 1 is improved. Also in the case where the external circulation path 30 is surrounded with a heat insulating material, a smaller amount of the heat insulating material is sufficient.

At this time, the damper 45 opens the inlet of the second pipe 33 of the external circulation path 30 and closes the exhaust port 32. Steam flows from the first pipe 31 to the second pipe 33, the third pipe 36, and then the sub-cavity 40. The steam is heated in the sub-cavity 40 by the steam heater 41 and, after that, is blown downward from the top blowhole 43.

When the water in the pot 51 boils, saturated steam at a pressure of 1 atm at 100° C. is generated. The saturated steam is sucked into circulating gas current flowing in the external circulation path 30 at the steam ejector 34. Since an ejector structure is employed, the saturated steam is promptly sucked in. Because of the ejector structure, the circulating gas current does not apply pressure to the steam generator 50 and does not hinder discharge of the saturated steam.

In the rear ejector 37, steam is sucked from the bypass 38 by the gas current blown from the outer nozzle 35 of the steam ejector 34. By the existence of the bypass 38 bypassing the steam ejector 34 to directly introduce steam to the downstream side of the steam ejector 34, pressure loss of a circulation system is reduced and the centrifugal fan 26 can be driven efficiently.

The steam ejected from the rear ejector 37 flows into the sub-cavity 40 at high speed. The steam introduced to the sub-cavity 40 is heated to 300° C. by the steam heater 41 and becomes superheated steam. The superheated steam expands as the temperature rises, and blows with force from the top blowhole 43.

Figure 8:
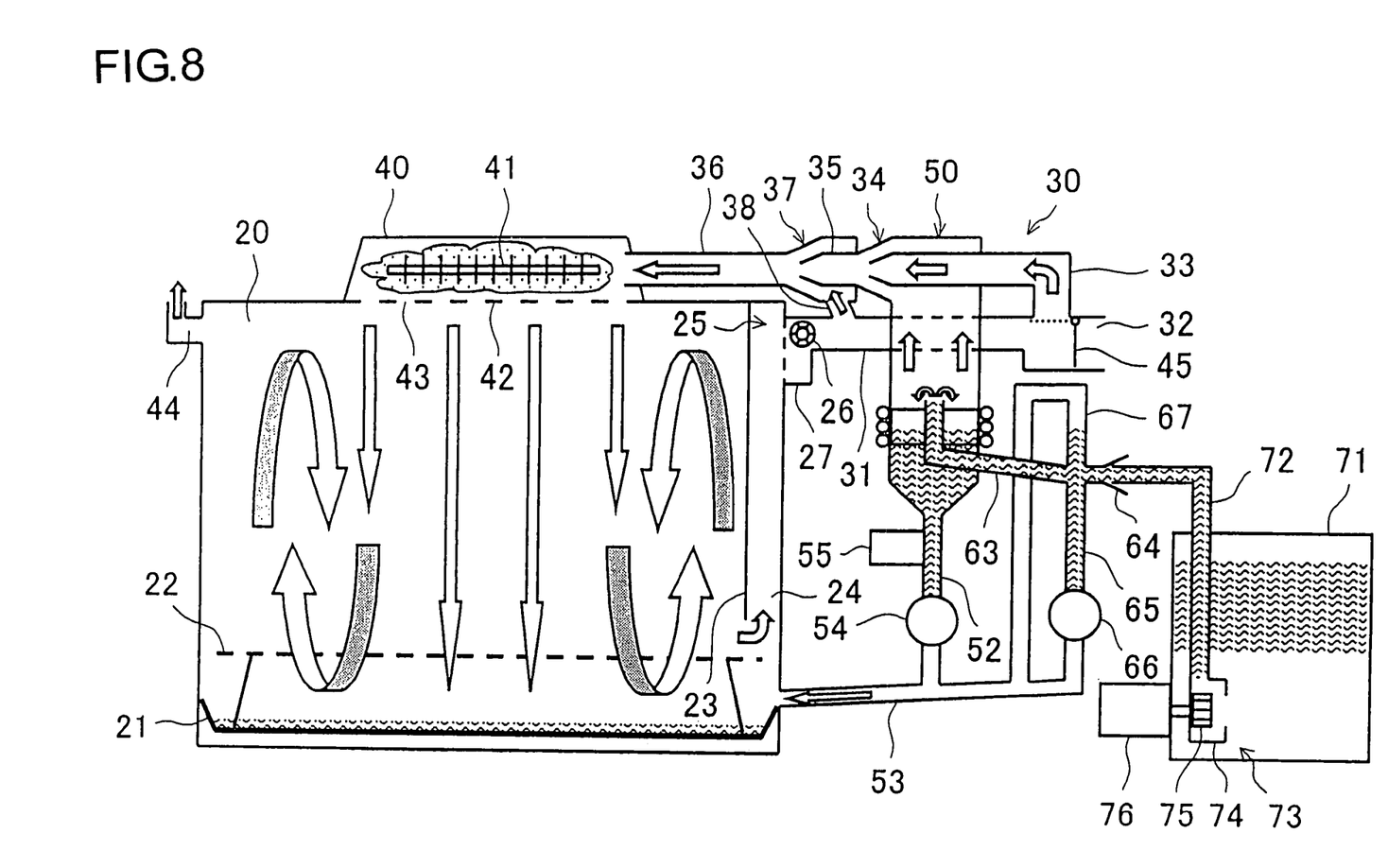
FIG. 8 A basic structural diagram similar to FIG. 3 but showing a state different from FIG. 3.

FIG. 8 shows the flow of the steam in a state where foods 90 are not put in the cooking chamber 20. As described above, the top blowhole 43 is directed right downward and the steam is blown downward with force so as to reach the bottom of the cooking chamber 20. The steam collided with the bottom of the cooking chamber 20 changes its direction to the outer side. The steam goes out from the downward current and starts rising. Since the steam, particularly, superheated steam is light, such a direction change naturally occurs. In the cooking chamber 20, as shown by the arrows in the diagram, the gas is circulated by convection current such a manner that the steam flows downward in the center portion and rises on the outside of the center portion.

Figure 9:
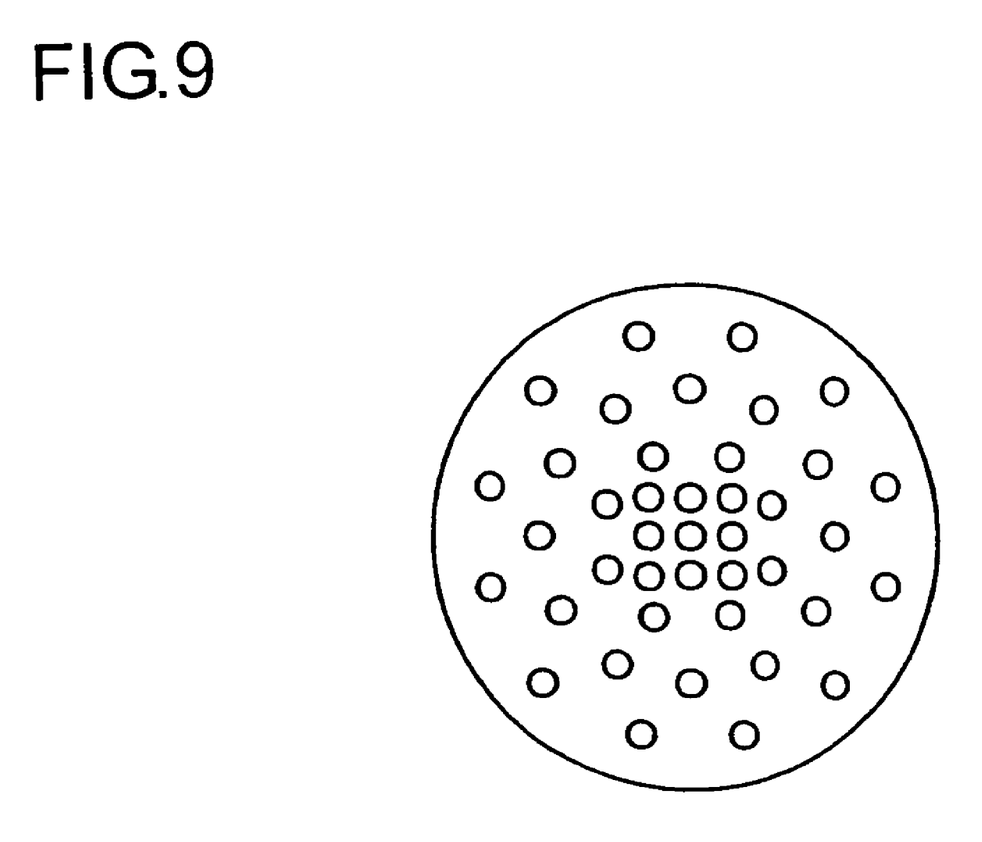
FIG. 9 A top view of a bottom panel of a sub-cavity.

In order to form a distinctive convection current, the dispersion of the perforations of top blowhole 43 is devised. As shown in FIG. 9, the perforations of the top blowhole 43 are disposed so as to be comparatively dense in the center portion of the bottom panel 42 and so as to be comparatively sparse in the peripheral portion. With this dispersion, the force of the downward steam is weak in the peripheral portion of the bottom panel 42 and does not hinder rise of the steam, so that a more distinctive convection current is formed.

The steam forming the convection current is sucked again into the suction port 24 and returns from the external circulation path 30 to the cooking chamber 20 via the sub-cavity 40. In such a manner, circulation of the steam in the cooking chamber 20, that goes out to the external circulation path 30 and returns to the cooking chamber 20, is repeated.

As time elapses, the proportion of steam in the gas increases. Excessive gas is discharged from the steam bleeding port 44 to the outside of the cooking chamber 20. If the gas containing steam is discharged directly into the cabinet 10, dew condensation develops inside the cabinet 10 to cause undesirable results such as rusting or electric leakage. If the gas is discharged directly to the outside of the cabinet 10, dew condensation spreads over a kitchen wall and the wall becomes susceptible to mold attack. To avoid this, the gas is introduced into a maze-like dew condensation path (not shown) provided inside the cabinet 10 to condensate dew, and then discharged outside of the cabinet 10. Water resulted from the dew condensation is collected in the pan 21 together with water resulted from other causes, and dumped after cooking.

When the gas containing superheated steam starts blowing, the temperature in the cooking chamber 20 rapidly rises. When the temperature sensor 82 senses that the temperature in the cooking chamber 20 reaches cooking range, the controller 80 displays the message on the operation panel 11 and beeps a sound. Being informed by sound or display that cooking is enabled, the user opens the door 12 and puts foods 90 into the cooking chamber 20.

When the user starts to open the door 12, the controller 80 changes the state of the damper 45 to close the inlet of the second pipe 33 and to open the exhaust port 32. The gas in the cooking chamber 20 is sucked by the blower 25 and, then, is exhausted from the exhaust port 32. When the inlet of the second pipe 33 is closed, the superheated steam from the top blowhole 43 is not blown, so that the user does not burn his/her face or hands with the superheated steam. The damper 45 maintains its state of opening the exhaust port 32 and closing the inlet of the second pipe 33 while the door 12 is open.

If gas exhaustion from the exhaust port 32 starts when the blower 25 is stopped, a time lag occurs until a stationary gas flow is obtained. In the case of the present invention, however, the blower 25 is already in operation, and no time lag takes place. Moreover, the current circulated in the cooking chamber 20 and the external circulation path 30 is directly turned into exhaust current from the exhaust port 32, there is also no time lag for changing the direction of current. Thus, the steam in the cooking chamber 20 can be exhausted without delay and the time required to enable the door 12 to be opened can be shortened.

At the time of exhausting steam from the cooking chamber 20, the second pipe 33 is closed and supply of steam to the cooking chamber 20 is stopped. Consequently, the pressure or quantity of the steam in the cooking chamber 20 decreases rapidly and the time required to enable the door 12 to be opened can further be shortened.

The signal that the user starts to open the door 12 can be transmitted to the controller 80, for example, as follows. A latch for maintaining the door 12 in a closed state is provided between the cabinet 10 and the door 12, and a latch lever for disengaging the latch is provided so as to be exposed from the handle 13. A switch which opens/closes in response to the motion of the latch or latch lever is disposed on the inside of the door 12 or the handle 13. When the handle 13 and the latch lever are gripped together for unlocking, a signal is transmitted from the switch to the controller 80.

Like the gas bled from the steam bleeding port 44, the gas discharged from the exhaust port 32 also contains a large quantity of steam, and the gas discharged as it is may cause problems. Therefore, the gas exhausted from the exhaust port 32 is also passed through the maze-like dew condensation path provided in the cabinet 10 to remove moisture, and only the dried gas is discharged to the outside of the cabinet 10. Water resulted from the dew condensation is collected in the pan 21 together with the water resulted from other causes, and dumped after cooking.

When the user sets foods 90 on the rack 22 and closes the door 12, the damper 45 is reset to the posture of opening the inlet to the second pipe 33 and closing the exhaust port 32. Consequently, blowing of the superheated steam from the top blowhole 43 is restarted and cooking of foods 90 starts.

The superheated steam heated to about 300° C. and blown downward from the top blowhole 43 strikes foods 90, and transfers heat to foods 90. Through this process, the steam temperature decreases to about 250° C. The superheated steam, which comes into contact with the surface of foods 90, discharges latent heat when dew is formed on the surface of foods 90. Foods 90 are heated also by the latent heat.

As shown in FIG. 3, the steam transmits heat to foods 90, after that, changes its direction to the outside, and goes out of the current blown downward. As described above, since the steam is light, after the steam deflects from the downward current, it starts turning round upward, thereby forming the convection current as shown by the arrows in the cooking chamber 20. By the convection current, while the temperature in the cooking chamber 20 is maintained at desired level, the superheated steam just heated in the sub-cavity 40 can be continuously made strike foods 90, and a large quantity of heat can quickly be transmitted to foods 90.

Since foods 90 are heated while circulating the gas in the cooking chamber 20, the energy efficiency of the steam cooker 1 is high. The superheated steam from above is ejected right downward from the plurality of perforations of the top blowhole 43, which are so disposed as to spread over almost the whole surface of the bottom panel 42 of the sub-cavity 40, that foods 90 are wholly surrounded by the steam from above. Because the steam that strikes foods 90 is superheated and its striking area is wide, the heat of the superheated steam is quickly, efficiently transmitted to foods 90. Heating of the gas supplied into the sub-cavity 40 by the steam heater 41 makes the gas expand, and this expansion causes increased jet force and increased collision speed with foods 90. Thus, foods 90 are heated more quickly.

Since the centrifugal fan 26 can generate higher pressure as compared with a propeller fan, the force of jet from the top blowhole 43 can be increased. As a result, the jet of superheated steam can be blown with force so as to reach the bottom of the cooking chamber 20, and foods 90 can be heated intensely. And the centrifugal fan 26 is rotated at high speed by the DC motor and gas is blown strongly, the effect appears more conspicuously.

The strong blowing power of the blower 25 is very useful also to rapidly exhaust the gas from the exhaust port 32 at the time of opening the door 12.

The suction port 24 is positioned at a lower part of the side wall of the cooking chamber 20 (at or lower than the height of foods 90). The steam jet blown from the top blowhole 43 travels straight without being deflected, strikes foods 90 and is sucked into the suction port 24. Consequently, the capability of heat transmission to foods 90 is maintained at a high level. Since the steam jet from above is sucked to the lower part of the side wall, when the door 12 is opened, the steam will not flow toward the user aggressively, making the safety level of the steam cooker high.

As the suction port 24 faces downward, the lateral force acting on the steam jet becomes modest and the steam jet can be prevented from being deflected. Even if oil bubbles from the surface of foods 90, the oil is not so easily sucked into the suction port 24, that the inner surface of the blower 25 and the external circulation path 30 is prevented from oil accumulation.

The top face of the bottom panel 42 of the sub-cavity 40 wears dark color and absorbs radiation heat generated by the steam heater 41 well. The radiation heat absorbed by the bottom panel 42 is radiated from the bottom face of the bottom panel 42 of dark color into the cooking chamber 20. Consequently, temperature rise of the sub-cavity 40 and the outer surface of the sub-cavity 40 is suppressed and the safety of the steam cooker is improved. On the other hand, the radiation heat of the steam heater 41 is transmitted to the cooking chamber 20 via the bottom panel 42 and the cooking chamber 20 is heated more efficiently.

The shape in plan view of the bottom panel 42 may be circular or rectangular similar to that of the cooking chamber 20. As described above, the ceiling of the cooking chamber 20 may also serve as the bottom panel of the sub-cavity 40.

In the case where foods 90 are meat, as the temperature rises, oil may drip. In the case where food 90 is liquid in a vessel, it may spill during boiling. Dripped or spilled liquid is received by the pan 21 and dumped after cooking.

In accordance with steam generation by the steam generator 50, the water level in the pot 51 lowers. When the water-level sensor 55 senses that the water level has lowered to a predetermined level, the controller 80 restarts operation of the pump 73. The pump 73 pushes up the water in the water tank 71 and supplies water as a compensation for evaporated water. When replenishment water passes through the water supply pipe 63, the heat of the steam generation heater 56 is transferred to the replenishment water via the fins 62 of the heat transfer unit 60. The replenishment water is thereby preheated and time required for the replenishment water to reach the boiling point is shortened.

The replenishment water overflowing from the upper end of the water supply pipe 63 is sprinkled on the upper part of fins 62 out of water. The temperature of the part of the fins 62 exposed out of water is higher than that of the part in the water, so that the water sprinkled on the fins 62 instantaneously boils and evaporates, thereby increasing the steam pressure in the pot 51. Consequently, the steam blows forcefully from the outer nozzle 35, flows into the sub-cavity 40, and energizes jet of the superheated steam from the top blowhole 43. Therefore, strong jet of the superheated steam is generated each time water is supplied.

At the time when the water-level sensor 55 senses that the water level in the pot 51 rises to the predetermined level, the controller 80 stops driving of the pump 73. In such a manner, the pump 73 intermittently performs water supply during cooking. The temperature of the part of the fins 62 exposed out of water temporarily drops each time water is sprinkled, and resumes its desired level soon after water sprinkling is stopped. Thereby, each time water is sprinkled, the water evaporates rapidly, and the jet power of the superheated steam is increased.

Figure 10:
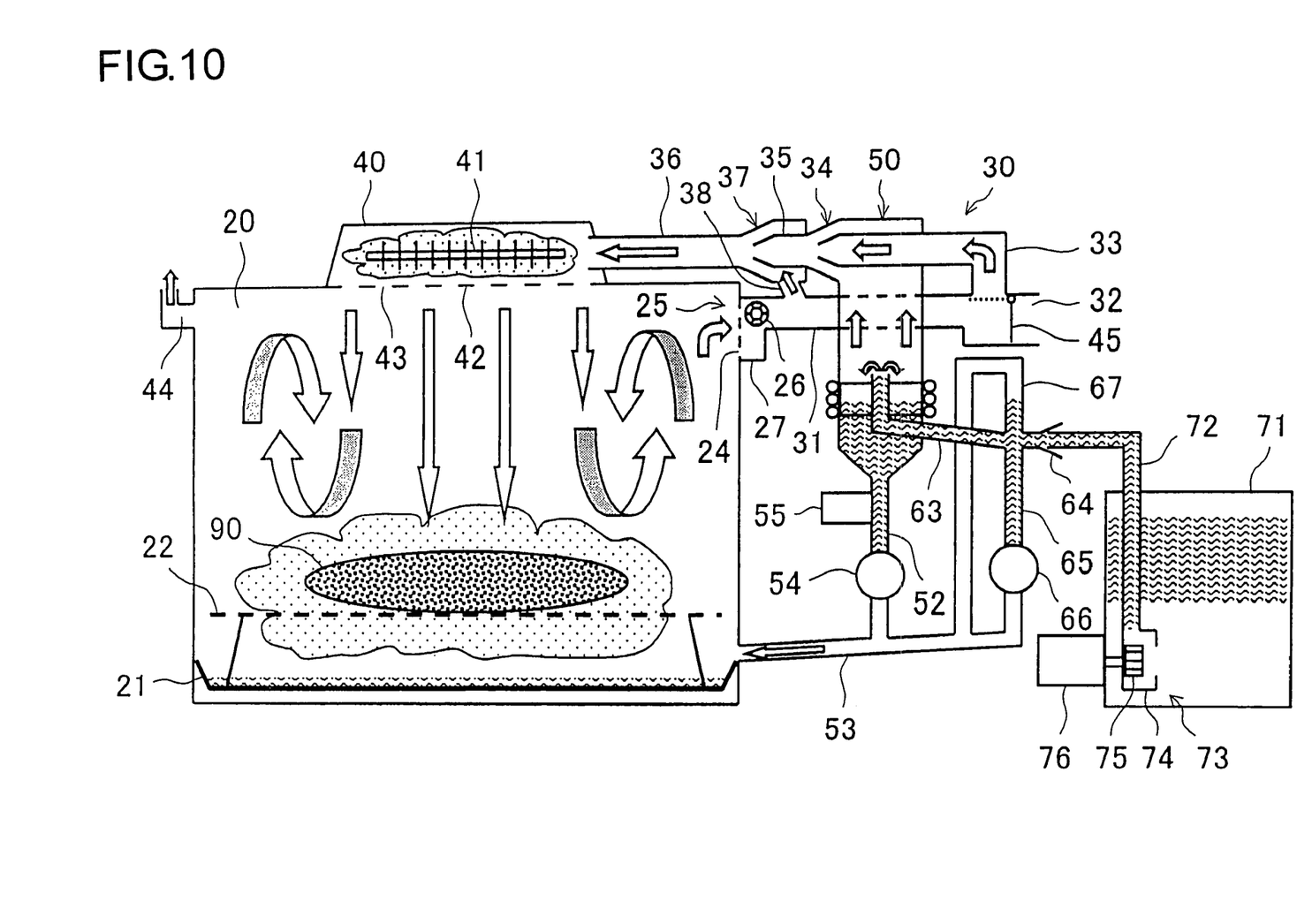
FIG. 10 A basic structural diagram similar to FIG. 3, according to a second embodiment.
Figure 11:
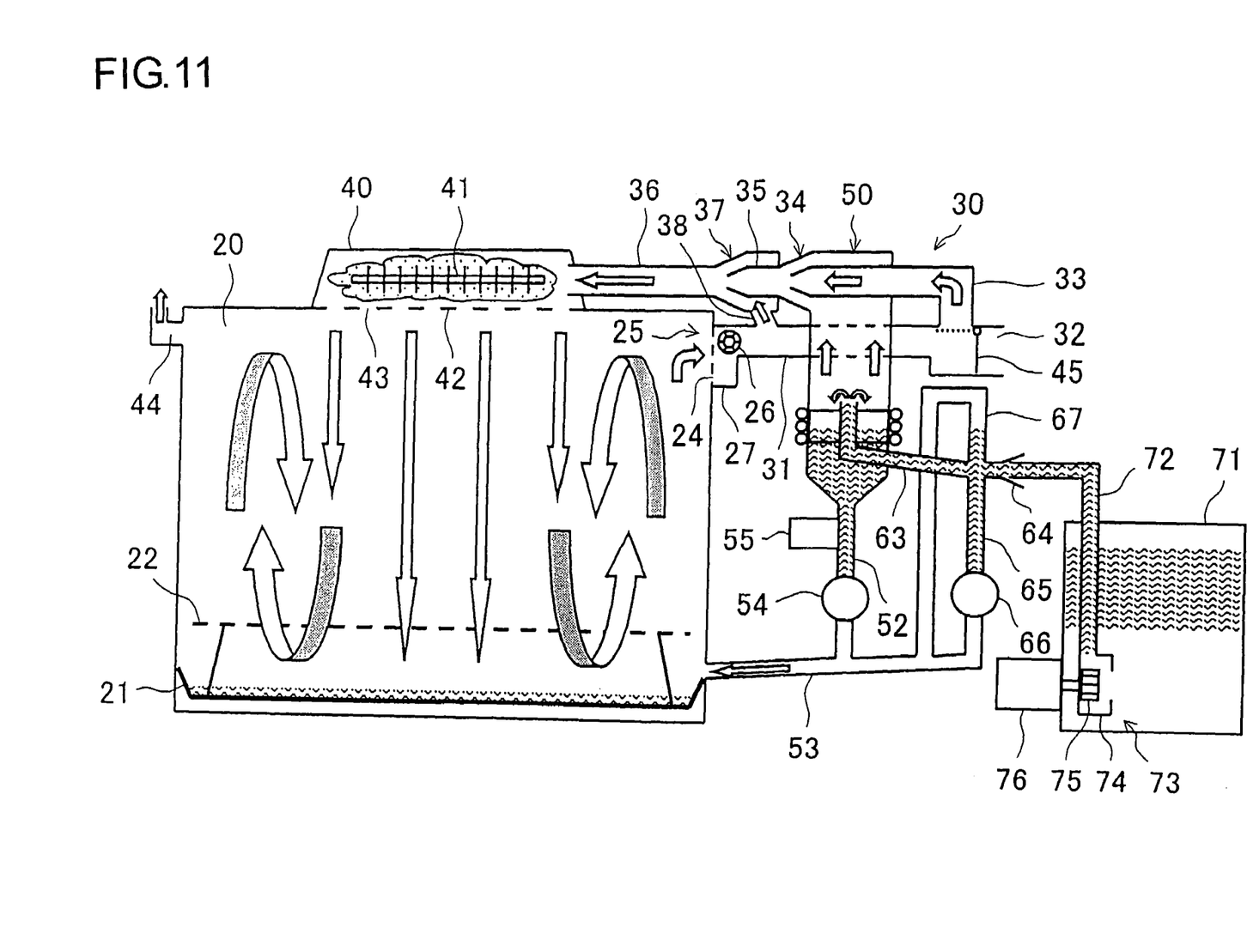
FIG. 11 A basic structural diagram similar to FIG. 10 but showing a state different from FIG. 10.

A second embodiment of the present invention is shown in FIGS. 10 and 11.

FIG. 10 is a basic structural diagram similar to FIG. 3, and FIG. 11 is a basic structural diagram similar to FIG. 10 but showing a state different from FIG. 10. Most of the components of the second embodiment are the same as those of the first embodiment. Consequently, in order to avoid repetition of the description, the same reference numerals as those of the first embodiment are designated to the components common to those of the first embodiment and description thereof will not be repeated herein.

The steam cooker 1 according to the second embodiment does not have the gas current control panel 23, which exists in the first embodiment. The suction port 24 is formed at upper part of the rear wall of the cooking chamber 20, in a manner that it opens laterally.

FIG. 11 shows the flow of the steam in a state where foods 90 are not put in the cooking chamber 20. Steam is blown right downward from the top blowhole 43 so as to reach the bottom of the cooking chamber 20. The steam strikes the bottom of the cooking chamber 20, and changes its direction to the outer side. The steam goes out from the downward current and starts turning round upward. In the cooking chamber 20, as shown by the arrows in the figure, convection current is generated in the form such that the steam flows downward in the center portion and rises on the outside of the center portion.

In a state where foods 90 are put in the cooking chamber 20 as shown in FIG. 10, superheated steam blown downward from the top blowhole 43 strikes foods 90 and transmits heat to foods 90. After that, the superheated steam changes its direction to the outer side. The steam goes out from the downward current and then rises, thereby generating convection current as shown by the arrows in the cooking chamber 20.

In the second embodiment, since the suction port 24 is disposed at an upper portion of the cooking chamber 20, the steam is sucked into the blower 25 from an upper corner of the cooking chamber 20, where the steam tend to stagnate. Therefore, the convection current is not easily be disturbed, and a cycle, in which steam blown downward strikes foods 90, then deflects from the downward current, and then turn round upward, and thereby forming convection current, is stably maintained.

Although the configuration of returning the gas in the cooking chamber to the sub-cavity via the external circulation path is employed in the foregoing embodiments, configurations different from the above can also be employed. For example, a configuration, in which fresh gas is always supplied into the sub-cavity and excessive gas in the cooking chamber bleeds from the gas bleeding port, is possible.

The present invention can further be variously modified without departing from the gist of the present invention.

INDUSTRIAL APPLICABILITY

The present invention can be applied to all cooking devices that cook food by superheated steam, regardless they are for home-use or professional use.

The invention claimed is:

1. A steam cooker comprising:
   (a) a cooking chamber in which foods are put;
   (b) a steam generator;
   (c) a sub-cavity provided above and in a center of a ceiling of the cooking chamber;
   (d) steam heating means disposed in the sub-cavity for heating steam introduced to the sub-cavity so that the steam becomes superheated steam;
   (e) a top blowhole which is formed in the ceiling of the cooking chamber, the top blowhole directed to the foods put in the cooking chamber; and
   (f) a blower for blowing superheated steam downward from the top blowhole with force so that the superheated steam reaches a bottom of the cooking chamber.

2. The steam cooker according to claim 1, wherein the top blowhole is disposed at a center portion of the ceiling.

3. The steam cooker according to claim 2, wherein the top blowhole is directed downward.

4. The steam cooker according to claim 3, wherein the top blowhole consists of plurality of perforations, and the perforations are disposed so as to spread over foods so that the foods are substantially wrapped by superheated steam blown from the top blowhole.

5. The steam cooker according to claim 1, wherein the top blowhole is formed in a partition panel between the sub-cavity and the cooking chamber.

6. The steam cooker according to claim 5, wherein both sides of the partition panel are a dark color.

7. The steam cooker according to claim 1, further comprising:
   a blower for forcibly feeding steam generated by the steam generator to the top blowhole.

8. The steam cooker according to claim 7, wherein the blower and the steam generator are disposed within an external circulation path communicating a suction port provided in the cooking chamber with the top blowhole.

9. The steam cooker according to claim 8, wherein the suction port is disposed at a lower part of the cooking chamber.

10. A steam cooker comprising:
    (a) a cooking chamber in which foods are put;
    (b) a steam generator;
    (c) a sub-cavity provided above and in a center of a ceiling of the cooking chamber;
    (d) steam heating means disposed in the sub-cavity for heating steam introduced to the sub-cavity so that the steam becomes superheated steam;
    (e) a top blowhole which is formed in the ceiling of the cooking chamber, the top blowhole directed to the foods put in the cooking chamber; and
    (f) a blower for blowing superheated steam downward from the top blowhole with force so that the superheated steam reaches a bottom of the cooking chamber, wherein the top blowhole is disposed at a center portion of the ceiling, the top blowhole is directed downward, the top blowhole consists of plurality of perforations, and the perforations are disposed so as to spread over foods so that the foods are substantially wrapped by superheated steam blown from the top blowhole, and the perforations of the top blowhole are disposed comparatively densely in the center portion and comparatively sparsely in the peripheral portion.

11. A steam cooker comprising:
(a) a cooking chamber in which foods are put;
(b) a steam generator;
(c) a sub-cavity provided above and in a center of a ceiling of the cooking chamber;
(d) steam heating means disposed in the sub-cavity for heating steam introduced to the sub-cavity so that the steam becomes superheated steam;
(e) a top blowhole which is formed in the ceiling of the cooking chamber, the top blowhole directed to the foods put in the cooking chamber;
(f) a blower for blowing superheated steam downward from the top blowhole with force so that the superheated steam reaches a bottom of the cooking chamber; and
(g) a blower for forcibly feeding steam generated by the steam generator to the top blowhole, wherein the blower and the steam generator are disposed within an external circulation path communicating a suction port provided in the cooking chamber with the top blowhole, and the suction port is disposed at an upper part of the cooking chamber.

* * * * *